United States Patent [19]
Di Martino

[11] 3,972,425
[45] Aug. 3, 1976

[54] TANDEM MIDLOCK

[76] Inventor: John M. Di Martino, 72 Lumur Drive, Sayville, N.Y. 11782

[22] Filed: June 5, 1974

[21] Appl. No.: 476,379

[52] U.S. Cl. .......................... 214/10.5 R; 24/221 R; 105/366 R; 220/1.5
[51] Int. Cl.² ............................................. B65G 1/14
[58] Field of Search .......... 24/73 RM, 81 E, 221 R; 220/1.5; 312/111; 105/366 R, 463, 464; 296/35 A; 214/10.5 S, 10.5 R

[56] References Cited
UNITED STATES PATENTS

| | | | |
|---|---|---|---|
| 2,345,018 | 3/1944 | Teague | 52/580 |
| 2,963,310 | 12/1960 | Abolins | 105/366 C |
| 3,129,672 | 4/1964 | Gutridge | 105/366 R |
| 3,319,583 | 5/1967 | Gutridge | 105/366 R |
| 3,359,605 | 12/1967 | Hulverson | 105/366 R |
| 3,367,615 | 2/1968 | Turpen | 24/81 E |
| 3,691,595 | 9/1972 | Backetman | 24/81 E |
| 3,751,127 | 8/1973 | Black | 312/111 |
| 3,752,511 | 8/1973 | Racy | 105/464 |
| 3,754,805 | 8/1973 | Pangburn | 312/111 |
| 3,786,765 | 1/1974 | Burr | 312/111 |

FOREIGN PATENTS OR APPLICATIONS

| | | | |
|---|---|---|---|
| 1,367,792 | 6/1964 | France | 105/366 R |
| 91,769 | 7/1959 | Netherlands | 312/111 |
| 318,827 | 12/1969 | Sweden | 294/81 SF |
| 914,368 | 1/1963 | United Kingdom | 105/366 R |

Primary Examiner—Bernard A. Gelak
Attorney, Agent, or Firm—Robert A. Kelly

[57] ABSTRACT

Releasable vertical and horizontal coupling of stacked shipping containers at their standard corner fittings, particularly in hard to reach areas in a block of containers, is provided by a connector having an extended planar base member, adjacent each end of the lower surface of the base member a manually-operated twist-lock for engagement with a corner fitting through the elongate orifice in the horizontal face thereof to form a horizontal coupling between a pair of lower containers in end-to-end alignment, in the middle of the upper surface of the base member a ridge with a ramp surface facing towards each end of the base member, and, adjacent each end of the upper surface of the base member and rising therefrom, a post having a side comprising an inclined surface direct towards a ramp surface and spaced apart from and substantially parallel thereto. The ramp surface interacts with a corner fitting as an upper container gravitates into stacked relationship with a lower container, thereby generating a horizontal component of relative movement between the containers to guide the corner fitting of the upper container into trapped relationship between the post and the ramp surface. During uncoupling, the inclined surface of the post functions in a like manner to guide the corner fitting out of trapping relationship.

7 Claims, 6 Drawing Figures

TANDEM MIDLOCK

BACKGROUND OF THE INVENTION

This invention refers to apparatus and method for releasably securing a shipping container of standard type (I.S.O. standard) to a loading deck and/or another container within a stack of multiplicity of such containers. More particularly, the invention refers to a new and novel combined horizontal and vertical connector adapted to attachment through openings in corner fittings and/or load decks to cause a container to become interconnected with or coupled to another container or to a loading deck by engagement with the connector.

The prior art equipment for releasably coupling containers to form coherent structures or stacks comprises a variety of distinctly different manually-operated devices each designed for a specific place of use, such as between the deck and the lowermost container, between pairs of adjacent containers, between pairs of stacked containers, or on top of containers. The need to stock a suitable device for use in each of the various positions unduly increases the costs and complexity of the operation.

U.S. Pat. No. 3,691,595 summarizes the state of the art and provides a partial solution to the above described problem of stocking a large inventory of different devices by providing a vertical connector having a twist-lock for penetration into the elongate orifice of a corner fitting, the twist-lock automatically activated by the vertical compression caused by the weight of a gravitating container to release a force for rotation of the twist-lock towards a locking position. A special tool is needed to prepare the vertical connector prior to each use and for the manual release of the activated twist-lock during disassembly of the stacked containers.

While substantially eliminating some of the drawbacks of the prior art, U.S. Pat. No. 3,691,595 does not eliminate the need for a separate coupling device for horizontal coupling. Also, because the device includes active elements which require the use of a manually-operated special tool for unlocking, many of the problems associated with the uncoupling of vertical connectors located at interior positions in a stacked block of containers remain unsolved, inasmuch as stevedores must still climb up and down the container stack in order to release each locking mechanism prior to vertical separation of the containers.

Thus, the need still exists for a simple, rugged device, preferably without active elements subject to failure, which does not require a special tool or human interaction for unlocking, and which is simultaneously capable of releasably coupling containers horizontally as well as vertically.

SUMMARY OF THE INVENTION

These and other deficiencies of the prior art devices for coupling containers mutually in vertical and horizontal assemblies and to loading decks and the like are substantially eliminated in accordance with the present invention for releasable coupling of shipping containers wherein passive elements are combined with a pair of manually-operable twist-locks in a connector for the simultaneous releasable coupling of containers both horizontally and vertically.

According to the practice of this invention, my new and novel connector comprises a pair of manually-operable twist-lock means for releasable locking in the recess of a corner fitting so as to form a bridge structure horizontal coupling between a lower pair of abutting containers in end-to-end alignment, and a means for trapping the corner fitting of an upper container in stacked relationship with each one of the lower containers, the means for trapping including a means for generating a relative component of movement in a horizontal direction between a lower and an upper container while the upper container is being gravitated into stacked relationship with the lower container.

The means for trapping the corner fitting of an upper container prevents vertical separation of the upper container from the lower container upon which it is stacked, provided the stacked containers are kept under a restraint to prevent relative horizontal movement between the upper container and the lower container, as by use of a known horizontal restraint at a corner fitting distant from the connector. Vertical separation and removal of the upper container is possible only after removal of the horizontal restraint. In the absence of the horizontal restraint, the corner fitting is removable from the means for trapping when a vertical separation force is applied with respect to the upper and lower containers in stacked relationship.

A more complete understanding of the invention may be had by reference to the appended drawing when taken together with the description of the preferred embodiment.

DESCRIPTION OF THE PREFERRED EMBODIMENT

Figure 1:
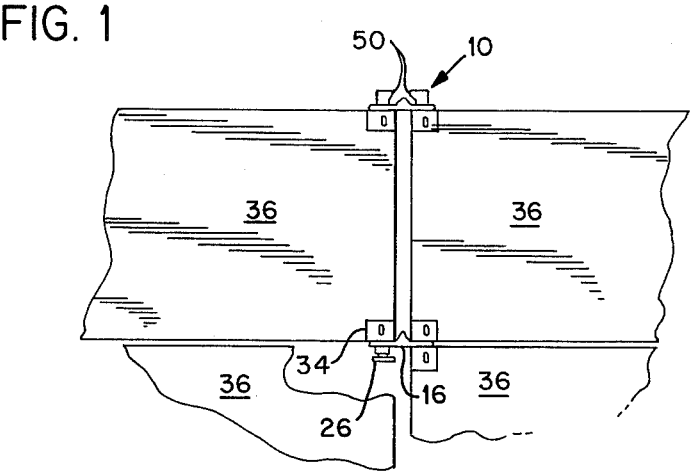
FIG. 1 is a fragmentary group elevation, partly cutaway, of a group of containers coupled both horizontally and vertically according to this invention.
Figure 2:
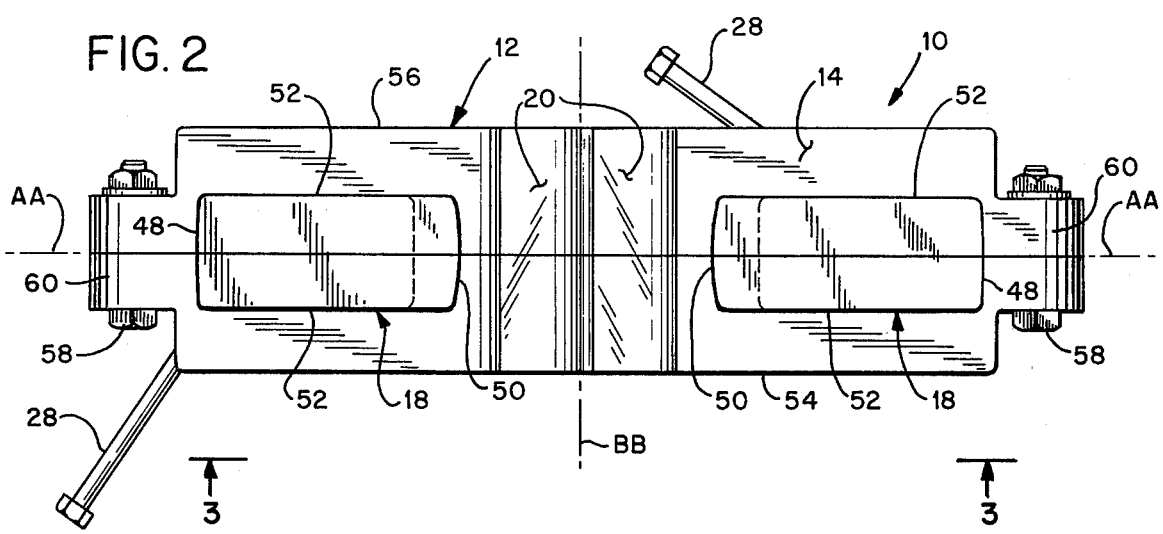
FIG. 2 is a plan view of the preferred embodiment of the connector of this invention.
Figure 3:
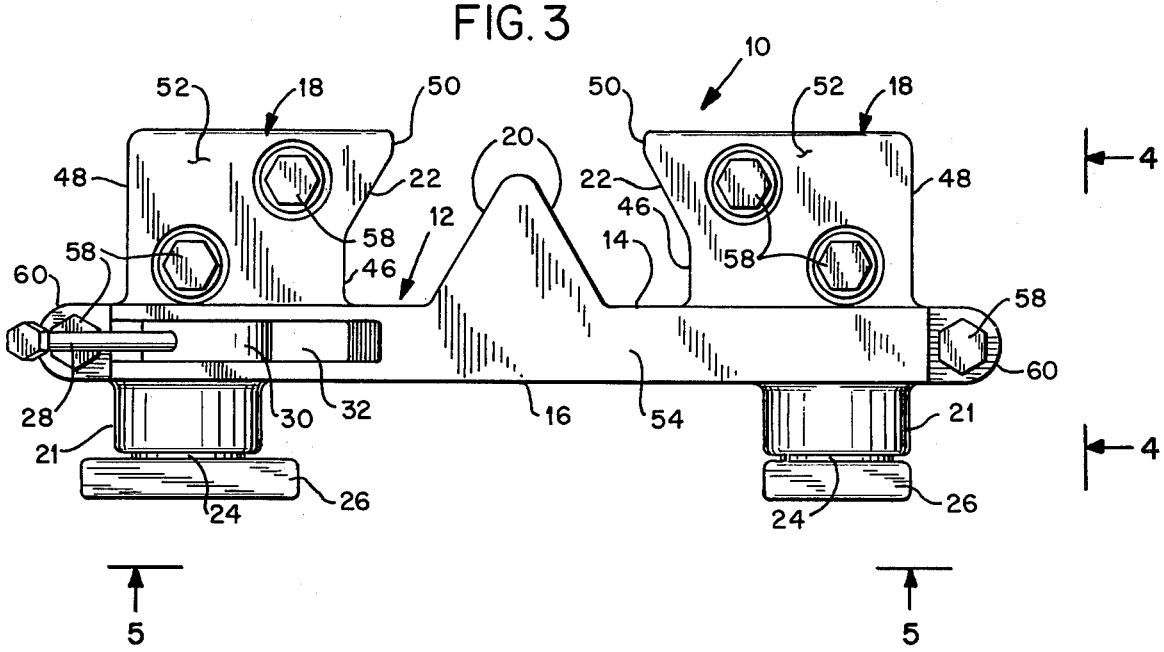
FIG. 3 is an elevation view of the connector along line 3—3 of FIG. 2.
Figure 4:
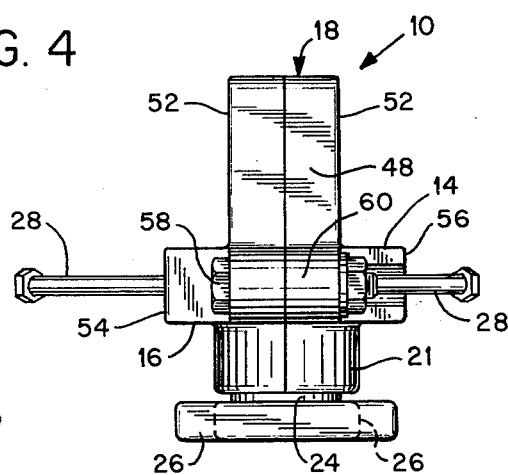
FIG. 4 is an end view of the connector along line 4—4 of FIG. 3.

Referring now to the drawings, wherein like identification symbols refer to like elements, connector 10 is a preferred embodiment of my invention for the combined releasable horizontal and vertical coupling of shipping containers which, for convenience, I call "tandem midlock", inasmuch as the connector is intended for use at a midpoint in a block of containers, which midpoint is not readily accesible after the block has been assembled. Connector 10 comprises two substantially identical body members forming an elongate base member 12, having a generally planar upper surface 14 and parallel lower surface 16, with a post 18, aligned on a longitudinal axis AA, rising from surface 14 on each side of a transverse axis BB, a ridge formed by a ramp surface 20 rising from surface 14 at both sides of transverse axis BB, and a twist-lock, below each post 18, extending through a skirt 21 depending from surface 16. Longitudinal axis AA and transverse axis BB, at their intersection, define a center for 180° rotational symmetry with respect to the identical body members. Each post 18 has a transverse side facing towards axis BB which includes a projecting nose formed by inclined surface 22 whose plane of inclination is substantially parallel to the plane of inclination of ramp surface 20. Each twist-lock comprises a leg member 24, a substantially rectangular planar foot 26, a lever arm 28, and a collar 30 on the end of leg member 24, captively supported for rotation in a slotted recess 32 of base member 12. Foot 26 is substantially parallel to surface 16 and extends beyond skirt 21 which depends from surface 16. Lever arm 28 is threadably connected to collar 30 through a side opening of slotted recess 32.

Connector 10 is intended for use with a standard corner fitting 34 of a container 36. Each corner fitting 34 has an interior recess 38 accessible through an elongate orifice 40 in the horizontally-disposed surface 42 thereof, the axis of elongation of orifice 40 substantially perpendicular to an exterior vertical face 44 thereof.

Post 18 of connector 10 is proportioned in accord with the standard dimensions established for corner fitting 34 so that the transverse end-wall 46 extends between inclined surface 22 and upper surface 14 a height sufficient to penetrate through orifice 40 into recess 38 when surface 42 and surface 14 are in flush contacting engagement, and transverse end-wall 48 is spaced apart from nose 50 along the longitudinal axis AA a distance which is less than the length of orifice 40 along its axis of elongation. Substantially planar side-wall 52 is parallel to and separated from longitudinal axis AA a distance such that the width of post 18 of the assembled connector is less than the transverse dimension of orifice 40.

Similarly, the twist-lock is designed so that foot 26 can penetrate into recess 38 and be rotated to a locking position by lever arm 28 when surface 16 is in flush contact with surface 42.

The distance, along longitudinal axis AA on surface 14, between end-wall 46 and the juncture with ramp surface 20 is substantially equal to the distance, along the axis of elongation of orifice 40, on surface 42 between vertical face 44 and the closest edge of orifice 40.

When the substantially identical body members of connector 10 are assembled together, opposite facing side-walls 54 and 56 each have an opening for the movement of lever arm 28 adjacent one end. The assembled connector is secured with fasteners 58, as shown, comprising threaded bolts and nuts with washers and lock washers as is known in the art, recessed in wells of side-wall 52. Additional fasteners 58 can be provided transverse to side-walls 54 and 56, or, as shown, at ears 60 adjacent the ends thereof.

Figure 5:
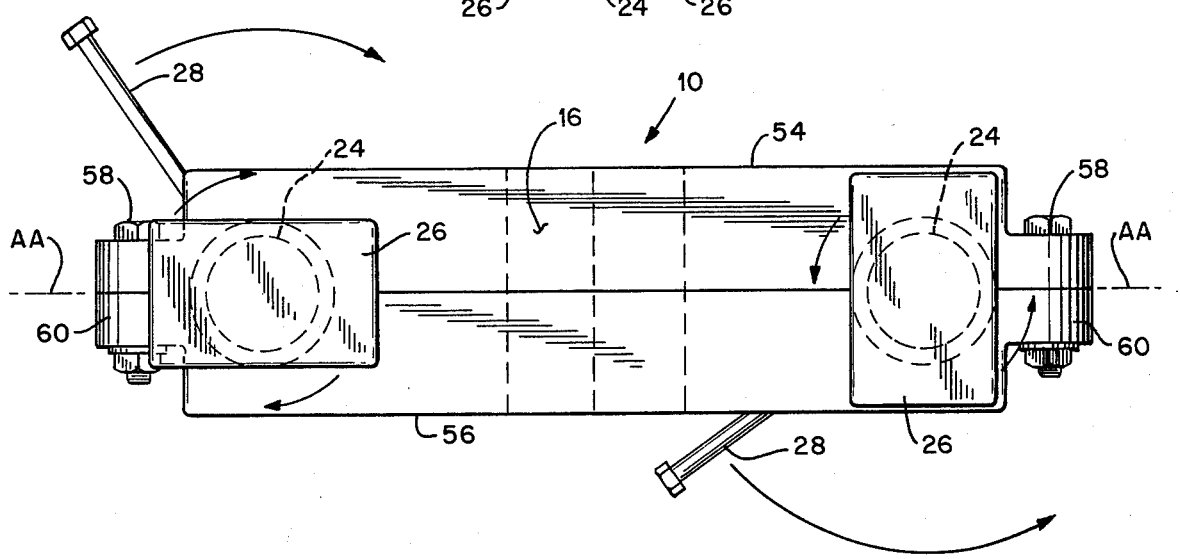
FIG. 5 is a bottom view of the connector along line 5—5 of FIG. 3.
Figure 6:
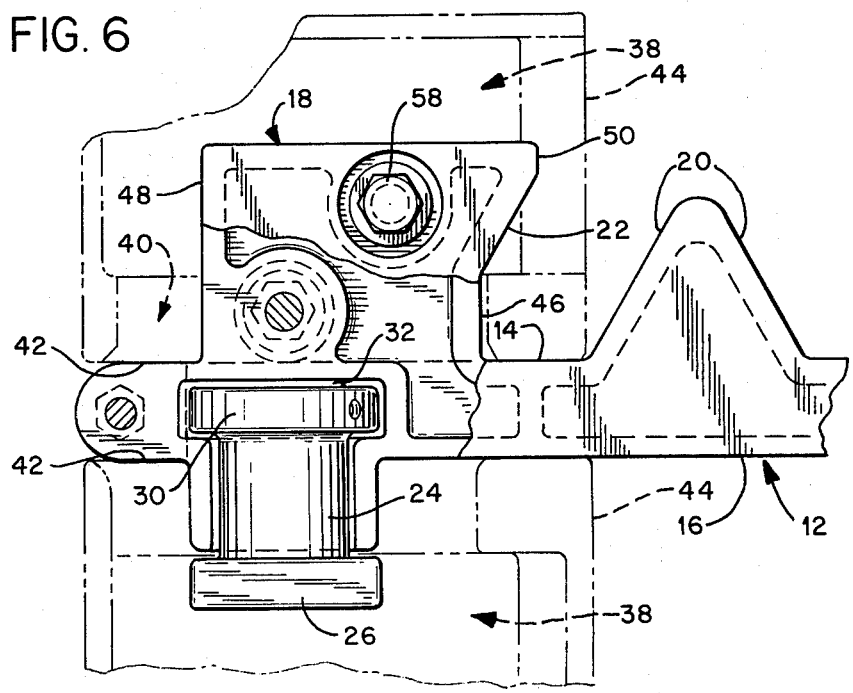
FIG. 6 is an enlarged detail fragmentary view, part cutaway and phantom, showing one end of the connector vertically coupling the corner fittings of two containers in stacked relationship.

The mode of operation of my invention can now be understood by reference to FIG. 1 and FIG. 6 of the drawing wherein connector 10 is shown, at the top of FIG. 1, horizontally coupling a pair of adjacent containers and the vertical coupling between stacked containers is shown in detail in FIG. 6. To horizontally couple two containers already situate in proper spaced apart relationship, lever arm 28 of each twist-lock is positioned as far away from transverse axis BB as is possible within the limits of movement determined by the extent of the opening into slotted recess 32, thereby positioning foot 26 in the position shown at the left hand side of FIG. 5, aligned for insertion in orifice 40. Each foot 26 is then inserted through a one of each orifice 40 until surface 16 is in flush contact with each upwardly facing horizontal surface 42. Rotation of each lever arm 28 through an angle 90° to the other extremity of the opening into slotted recess 32 aligns each foot 26 in the position shown at the right hand side of FIG. 5, whereby engagement of foot 26 with the interior of recess 38 prevents vertical separation of connector 10 from each corner fitting 34. It is now possible to vertically couple an upper container at each post 18 by aligning a container above one of the lower containers with orifice 40 of its corner fitting 34 in facing relationship with the upper end of post 18, the axis of elongation of orifice 40 and the longitudinal axis AA being substantially parallel, and gravitating the upper container downwardly until post 18 penetrates into orifice 40. This action will cause the edge, formed by the junction of horizontally disposed surface 42 and vertical face 44 of corner fitting 38, to interact with ramp surface 20 in sliding engagement so as to generate a relative component of movement of the gravitating container in the direction parallel to surface 42 along longitudinal axis AA, until surface 42 and surface 14 are in flush contact and the portion of surface 42 between orifice 40 and vertical face 44 is trapped between end-wall 46 and ramp surface 20, with inclined surface 22 engaging the interior edge of orifice 40 inside recess 38. Thus, inclined surface 22, end-wall 46, ramp surface 20, and the portion of upper surface 14 therebetween, cooperatively interact with a standard corner fitting to constitute a means for trapping the corner fitting.

Once the vertical couple has been formed by the procedure above described, the coupling can be secured against vertical separation by providing a horizontal restraint to prevent relative horizontal movement between the upper container and the lower container as is known in the art. As those skilled in the art will appreciate, containers vertically coupled by the connector of my invention cannot be separated unless there is a relative horizontal component of movement between the containers, which component of movement is in the direction parallel to the axis of elongation of each elongate orifice. Therefore, any horizontal restraint of the type described will suffice to secure against vertical release of the coupling.

It would be obvious to one skilled in the art to increase the dimension of the exterior of skirt 21 in the direction parallel to longitudinal axis AA so as to be almost equal to the length of orifice 40 along its axis of elongation in order to produce an embodiment of my invention which provides the necessary horizontal restraint for vertical securing when used in the configuration of FIG. 1, wherein the lower connector forms both a horizontal couple between adjacent containers and a vertical couple between stacked containers while the upper connector forms a horizontal couple between the upper pair of containers.

After removal of the horizontal restraint, the vertical couple can be released and the upper container removed from the lower container by applying a vertical separating force therebetween. Any vertically directed movement between the containers initiates the interaction of the inner edge of orifice 40 with inclined surface 22 to produce the desired relative horizontal component of movement. Thus, during uncoupling, inclined surface 22 constitutes a means for generating a relative horizontal component of movement between the containers, just as ramp surface 20 provides a similar means during coupling.

After separation of the vertical coupling and removal of each upper container, the horizontal coupling is releasable upon manual actuation of the twist-lock in each corner fitting by the rotation of the appropriate lever arm.

Having explained the working of my invention when used for vertical coupling with simultaneous end-to-end horizontal coupling, it will now be obvious to those skilled in the art that two connectors of my invention can be modified to also provide for side-to-side coupling by interconnecting two of my connectors with suitable sized bolts and spacers, as at each ears 60, or through openings which can be provided in side-walls 54 and 56.

Since it is contemplated that the connector of my invention be manufactured for minimum cost and long trouble-free life with easy repair, the preferred embodiment of my invention herein disclosed has been designed to use identical cast metal body members which can be assembled and disassembled quickly if necessary in the field using simple tools. Similarly, the other components of my connector are designed for simplicity in fabrication and assembly. Reinforcement is provided where strength is needed and edges and corners have been rounded, as will be understood by those skilled in the art, to protect against excessive wear which can result from vigorous metal-to-metal contact during use. It would be obvious to provide additional reinforcement in the form of a frusto-pyramidal cap on the top of post 18, between nose 50 and end-wall 48, since this is the component most apt to suffer from impact during the act of coupling. Conversely, it would be equally obvious to provide relief where the mass of metal or its cross-section can be reduced without sacrifice of function or strength. Thus, each of the body members can be relieved at their mating surfaces to form the hollow cavities in the assembled connector, illustrated in FIG. 6 in cutaway and phantom.

Since the above and other non-inventive modifications of my invention will be obvious to artisans and others skilled in the art in the light of the teaching of my disclosure, my invention should not be narrowly limited to the embodiment herein disclosed and illustrated in conformance with the statute, but should be construed broadly, according to the appended claims, wherein

I claim:

1. A combined horizontal and vertical connector for stackable containers, said containers of the type having an I.S.O. standard corner fitting at each of the corners thereof, said corner fitting having orifices in the outer surfaces thereof, said orifices opening into an inner recess in said fitting, said connector comprising:

means for defining a planar base member having a longitudinal axis;

a pair of individual manually operable twist locks, one of each being located at opposite ends of said planar base member, and depending from said planar base member along the longitudinal axis of said base member;

a pair of post means, one of each being located at opposite ends of said planar base member extending upward from said planar base member along the longitudinal axis of said base member, each of said post means having an inclined surface on the interior transverse side thereof substantially angled toward each other and each forming an acute angle with said planar base member; and, ridge means arising from said planar member located intermediate said post means, said ridge means having a ramp surface facing the inclined surface of each of said post means and being in substantially parallel alignment therewith, said ramp surface and said post means being sized and spaced apart sufficiently for guiding up to two upper situated containers into adjacently lockable engagement with said base member as a corner fitting of a one of said containers is lowered into flush contact with said base member while entrapping a portion of said corner fitting within the space between a said ramp means and a said inclined surface of a said post means, said post means penetrating into a said inner recess through a one of said orifices.

2. The connector of claim 1 wherein said connector comprises two substantially identical body members.

3. The connector of claim 2 wherein said connector has a center for 180° rotational symmetry.

4. The connector of claim 2 wherein each of said manually operable twist locks includes a lever arm extending outwardly through an opening in said base member.

5. In combination: at least a pair of stackable containers in end-to-end spaced horizontally alignment with a third container in tiered stacked arrangement supported on one of said pair, said containers and said third container of the type having an I.S.O. standard corner fitting at each of the corners thereof, said corner fitting having orifices in the outer surfaces thereof, said orifices opening into an inner recess in each said fitting; and, a combined horizontal and vertical connector having a pair of spaced-apart twist-locks, a planar base member, a pair of posts and a ridge means, said pair of twist-locks depending from a lower surface of said base member, each of said posts and said ridge means rising from the upper surface of said base member, each of said post means having an inclined surface on the interior transverse side thereof substantially angled toward each other and each forming an scute angle with said planar base member, ridge means arising from said planar member located intermediate said post means, said ridge means having a ramp surface facing the inclined surface of each of said post means and being in substantially parallel alignment therewith, each of said twist-locks engaged in a said recess through an orifice on an upwardly-facing outer surface of a said corner fitting, at least one of said posts penetrating into a recess through a said orifice in a downwardly-facing outer surface of a said corner fitting of said third container and engaging an interior edge thereof, said base member substantially in flush contact with said upwardly-facing outer surface and said downwardly-facing outer surface, and a said ramp surface engaging an outer edge of said corner fitting of said third container.

6. The combination of claim 5 which includes a fourth container in tiered stacked arrangement with said pair, said fourth container in end-to-end spaced horizontal alignment with said third container, one of said posts penetrating through a said orifice in a said downwardly-facing outer surface into a said inner recess while a said ramp surface is engaging an outer edge thereof and said base member is substantially in flush contact therewith.

7. The combination of claim 6 wherein said third container and said fourth container are coupled horizontally with a combined horizontal and vertical connector.

\* \* \* \* \*